United States Patent
Baehrle-Miller et al.

(10) Patent No.: US 8,991,943 B2
(45) Date of Patent: Mar. 31, 2015

(54) AUTOMATIC PARKING BRAKE HAVING A SLIP CONTROLLER

(75) Inventors: Frank Baehrle-Miller, Schoenaich (DE); Dieter Blattert, Kircheim/Neckar (DE); Vitaliy Bograd, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 1193 days.

(21) Appl. No.: 12/600,257

(22) PCT Filed: Mar. 19, 2008

(86) PCT No.: PCT/EP2008/053320
§ 371 (c)(1),
(2), (4) Date: Oct. 15, 2010

(87) PCT Pub. No.: WO2008/138668
PCT Pub. Date: Nov. 20, 2008

(65) Prior Publication Data
US 2011/0017554 A1   Jan. 27, 2011

(30) Foreign Application Priority Data
May 14, 2007 (DE) .......................... 10 2007 022 510

(51) Int. Cl.
*B60T 8/84*     (2006.01)
*B60T 8/1761*   (2006.01)
*B60T 7/12*     (2006.01)
*B60T 8/32*     (2006.01)

(52) U.S. Cl.
CPC ............. *B60T 8/17616* (2013.01); *B60T 7/12* (2013.01); *B60T 8/32* (2013.01)

USPC .......................................... 303/163; 303/189

(58) Field of Classification Search
USPC ......... 303/122, 149, 163, 169, 170, 189, 154, 303/158, 171, 172, 175; 701/71, 73, 78
See application file for complete search history.

(56) References Cited

U.S. PATENT DOCUMENTS

| | | | | |
|---|---|---|---|---|
| 3,918,766 A * | 11/1975 | Klatt | ............................. | 303/189 |
| 5,139,315 A * | 8/1992 | Walenty et al. | ............... | 303/162 |
| 5,980,000 A * | 11/1999 | Kolbe et al. | ................... | 303/139 |
| 6,050,655 A * | 4/2000 | Naito et al. | ................... | 303/173 |
| 6,502,029 B2 * | 12/2002 | O'Dea | ........................... | 701/71 |

(Continued)

FOREIGN PATENT DOCUMENTS

| | | |
|---|---|---|
| JP | 8-282462 | 10/1996 |
| JP | 9-328064 | 12/1997 |

(Continued)

OTHER PUBLICATIONS

International Search Report for PCT/EP2008/053320.

*Primary Examiner* — Nicholas J Lane
(74) *Attorney, Agent, or Firm* — Kenyon & Kenyon LLP

(57) ABSTRACT

A system, method and device are provided which relate to an automatic parking brake for motor vehicles having multiple brake actuators and an operating element for operating the parking brake. In embodiment, the brake actuators are connected to a controller, which is able to perform a wheel-specific slip control when a critical driving situation occurs. For example, a simultaneous locking and the loss of the cornering force can be prevented by a controller. The controller is designed in such a way so that when controlling the slip on a first wheel, the slip ($\lambda_2$) of a second wheel is taken into account.

15 Claims, 2 Drawing Sheets

(56) References Cited

U.S. PATENT DOCUMENTS

| | | | |
|---|---|---|---|
| 6,512,973 B2* | 1/2003 | O'Dea et al. | 701/71 |
| 6,964,460 B2* | 11/2005 | O'Dea | 303/139 |
| 2002/0113488 A1* | 8/2002 | Harris | 303/113.1 |
| 2002/0117891 A1* | 8/2002 | Harris | 303/20 |
| 2005/0121976 A1* | 6/2005 | O'Dea | 303/146 |
| 2006/0232126 A1* | 10/2006 | Giers et al. | 303/113.1 |
| 2008/0071458 A1* | 3/2008 | Fukasawa | 701/70 |
| 2009/0218881 A1* | 9/2009 | Aizawa et al. | 303/113.5 |

FOREIGN PATENT DOCUMENTS

| | | |
|---|---|---|
| JP | 2002-67916 | 3/2002 |
| JP | 2004-123084 | 4/2004 |
| JP | 2007-522398 | 8/2007 |
| WO | WO 2005/075848 | 8/2005 |
| WO | WO 2006/038309 | 4/2006 |

\* cited by examiner

AUTOMATIC PARKING BRAKE HAVING A SLIP CONTROLLER

FIELD OF INVENTION

The present invention relates to an automatic parking brake for motor vehicles, a method for controlling slip, and a control unit having a slip controller.

BACKGROUND INFORMATION

Automatic parking brakes (APB) typically include an operating element such as, e.g., a push-button switch by which the parking brake may be locked or released. When the operating element is actuated, a control unit connected to it recognizes the parking brake command and accordingly controls an actuator such as, e.g., a hydraulic pump or an electric motor in order to build up braking force on the wheels of the vehicle or to release the brake.

The following considers systems in which electric motors (having gear units) are situated directly on the wheel brakes (so-called "motor on caliper"). Such parking brake systems are typically designed so that the driver may operate them when the vehicle is at a standstill and while driving. The possibility of an operation while driving is provided particularly for the purpose of being able to brake the vehicle in the case of a defective service brake. In this case, the vehicle is braked with a predefined deceleration, e.g., 3 m/s². For this purpose, the deceleration of the vehicle is usually controlled.

A difficulty of such parking brake systems using electric motors is that the response of the mechanical components is substantially slower than in a hydraulic parking brake system. This results in a relatively poor controllability of the electromechanical systems. This may cause the braked wheels to lock too long while being controlled. In a critical driving situation, for example, when oversteering or understeering while cornering, a vehicle may lose its cornering force.

SUMMARY

Example embodiments of the present invention provide for the creation of an electromechanical parking brake that is more controllable and yet achieves a predefined deceleration of the vehicle than earlier systems.

Example embodiments of the present invention provide for performing a slip control on the braked wheels and designing the corresponding controller in such a way that when controlling the slip on a first wheel, the wheel slip of a second wheel is taken into account. For example, depending on the magnitude of the wheel slip of the other wheel, a decision is made whether or not the braking force on the controlled (first) wheel may be increased. Thus, the possibility that both wheels lock at the same time or have too much slip is eliminated. The cornering force is thus maintained at least on one wheel.

In example embodiments, the other wheel taken into account according to the present invention is the wheel of the same axle situated on the opposite side of the vehicle.

In example embodiments, the wheel slip of another wheel is ascertained and an increase of the braking force on the controlled (first) wheel is allowed only if the wheel slip of the other wheel is lower than a predefined threshold value. The threshold value may be, for example, between 3% and 5% wheel slip. The threshold value may be, for example, approximately 4% wheel slip. This makes it possible to prevent the two wheels from locking at the same time and to allow them to continue to take up cornering force.

In example embodiments, the slip controller is designed in such a way that the braking force on the controlled wheel is increased only if the wheel slip on this wheel is lower than a predefined threshold value. This threshold value may be approximately 4%. In an example embodiment, if the wheel slip is greater than the threshold value, then the braking force is reduced.

In example embodiments, the slip control additionally takes the deceleration of the vehicle into account. In this case, an increase of the braking force on the controlled wheel is allowed only if the deceleration of the vehicle is lower in terms of its absolute value than a predefined threshold value. Otherwise, in an embodiment, the braking force is left as it is.

In example embodiments, after a braking operation is triggered, the control operation on the left and right wheel is started asynchronously. That is, the electric motors are triggered in a time-delayed fashion. This has positive effects on the control response since it reduces the danger of an oscillating system in which both wheel brakes are synchronously opened or closed.

In example embodiments, the slip controller is integrated as a software algorithm in a control unit, which is connected to wheel speed sensors and/or an acceleration sensor and/or triggers the electric motors of the parking brake as described above.

BRIEF DESCRIPTION OF THE DRAWINGS

In the following, the present invention is explained in greater detail by way of example with reference to the attached drawings.

DETAILED DESCRIPTION

Figure 1:
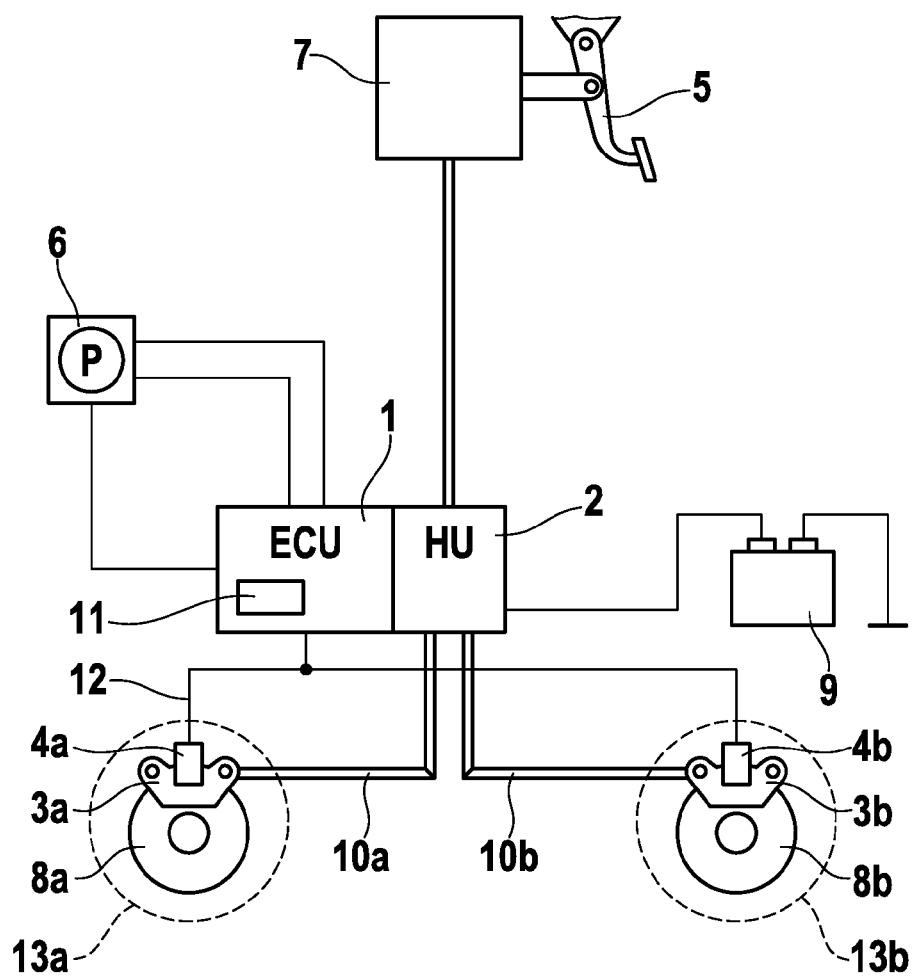
FIG. 1 shows a schematic representation of a motor vehicle braking system having an automatic parking brake.

FIG. 1 shows a block diagram of a hydraulic braking system having an automatic parking brake according to an embodiment of the present invention. In an available manner, the braking system includes a foot brake pedal 5, which acts together with a main brake cylinder via a brake booster (combined in block 7). The brake pressure produced by the driver and amplified is conducted via a hydraulic unit 2, which is designed to perform a slip control, and brake lines 10a, 10b to wheel brakes 3, 8. Wheel brakes 3, 8 are implemented in this example embodiment as disk brakes, which respectively include a brake caliper 3 and a brake disk 8.

The automatic parking brake includes an operating element 6 (e.g. a push-button switch) for activating and deactivating the parking brake, a control unit 1, connected to push-button switch 6, in which a parking brake algorithm having a slip controller 11 is stored, and multiple electric motors 4a, 4b, which are respectively mounted on a brake caliper 3a and 3b, respectively (motor on caliper). The system is supplied with voltage from a battery 9.

In example embodiments, to secure the vehicle in the parked state, the driver briefly operates push-button switch 6. Control unit 1 recognizes this as a parking brake command and thereupon activates the electric motors disposed on brake calipers 3 in order to build up braking force and to lock the brake pads. When electric motors 4 are in the locked position, then the brake pistons are prevented from returning into the start position such that the brakes stay clamped.

When push-button switch 6 is activated while driving, control unit 1 interprets this as a braking command. Control unit 1 thereupon triggers actuators 4 in such a way that the vehicle is braked at a predefined deceleration, e.g., 3 m/s². For example, if the wheels lock in such an emergency braking operation, e.g., because of a slippery roadway, a wheel-specific slip control is performed on wheels 13a and 13b, as shown in FIG. 2.

Figure 2:
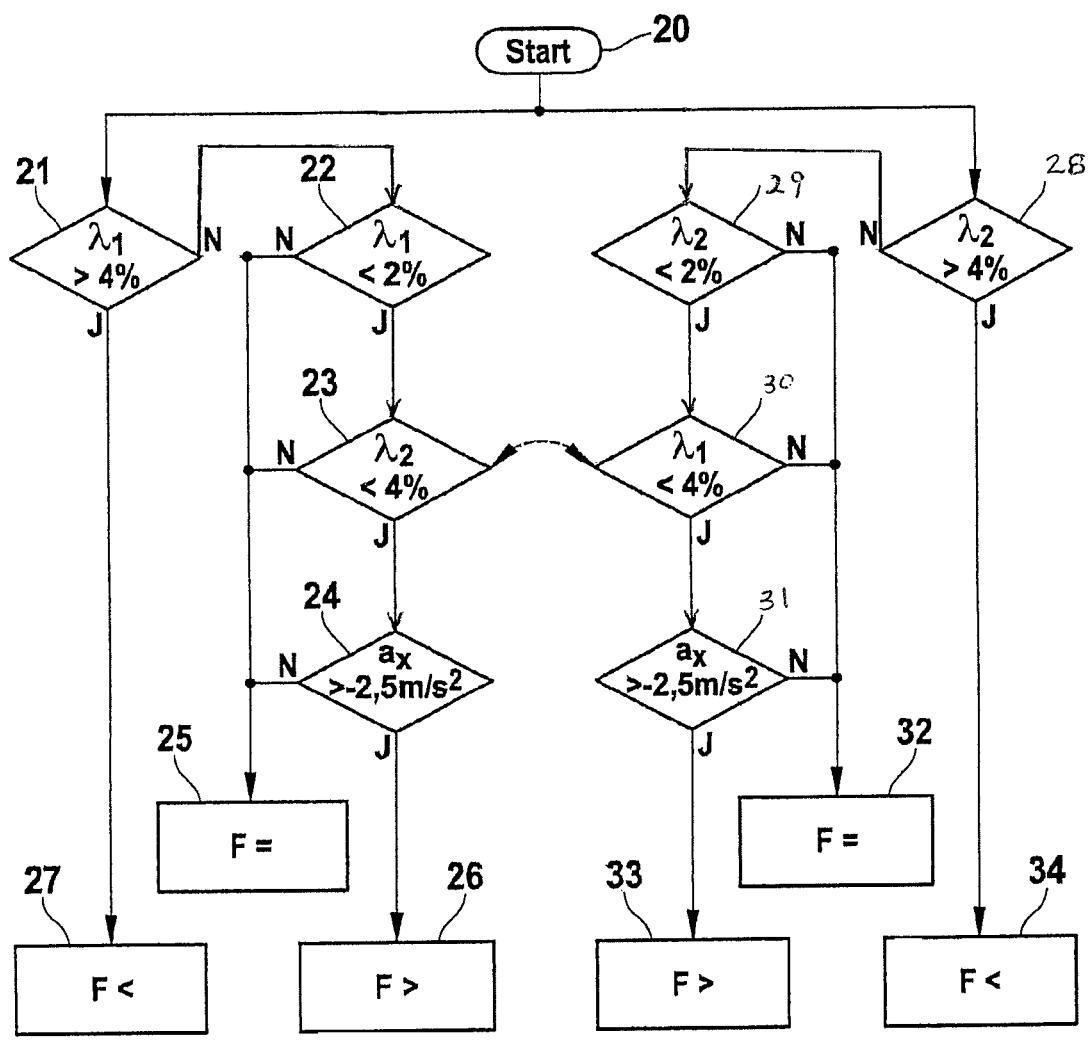
FIG. 2 shows a flow chart for illustrating the control strategy of the slip control.

FIG. 2 shows a flow chart concerning an example control strategy for the slip control of wheels 13a, 13b in an emergency braking operation using the parking brake embodiment. Wheels 13a, 13b are rear axle wheels. In this example, the example control strategy method used is identical for both wheels 13a, 13b; accordingly, in the following, only the left part of the flow chart is explained.

In this embodiment, as soon as the driver has activated push-button switch 6 in step 20, actuators 4a, 4b are triggered to brake the vehicle. In steps 21 and 22, the slip of wheel 13a is then checked. If slip $\lambda_1$ in step 21 is greater than e.g. 4%, then the clamping force of brake 3a, 8a is reduced in step 27. If $\lambda_1$ is lower than 4% and higher than 2% (N in steps 21 and 22)—corresponding to the ideal range between 2% and 4%—then there is no change in the clamping force (step 25). If slip $\lambda_2$ by contrast is lower than 2% (J in step 22) and thus theoretically the clamping force could be increased further on this wheel, slip $\lambda_2$ of the other wheel 13b is first taken into account in step 23. This is shown by an arrow illustrating the interaction between the two wheels. In an embodiment, if slip $\lambda_2$ of the other wheel 13b is greater than 4% (N in step 23), then there is no change in the clamping force (step 25) because the other wheel 13b already has a high slip. In an embodiment, if the slip of the other wheel 13b by contrast is lower than 4% (J in step 23), then the clamping force on wheel 13a is increased without losing the cornering stability. In an embodiment, as shown, for example, in step 24, additionally the deceleration of the vehicle is checked. In an embodiment, if the acceleration $a_x$ is greater than −2.5 m/s² (that is, for example, the acceleration is −1 m/s²), then the clamping force may be increased further in step 26. In an embodiment, if the acceleration $a_x$ is lower than −2.5 m/s² (N in step 25), then no clamping force change occurs on brake 3a, 8a.

Embodiments of the present invention are advantageous, in part, because at least one of the wheels has a low slip and is thus able to take up sufficient cornering force. In an embodiment, this is carried out analogously for the second wheel 13b by taking into account the wheel slip of first wheel 13a.

In an embodiment, following the triggering of the braking operation by activating push-button switch 6, the control operation is started on wheels 13a and 13b, respectively, e.g., in an asynchronous manner. In an embodiment, the triggering of the corresponding actuators 4a, 4b occurs left/right time-delayed by 150 ms, for example. This has positive effects on the control response, for example, since the time-delayed triggering reduces the danger of an oscillating system in which both wheel brakes are synchronously opened or closed.

What is claimed is:

1. An automatic parking brake system for a motor vehicle, wherein the motor vehicle has at least one additional service brake distinct from the automatic parking brake system, the automatic parking brake system comprising:
   multiple parking brake actuators;
   an operating element for operating the parking brake system; and
   a controller, wherein the multiple parking brake actuators are connected to the controller, the controller being configured to perform a wheel-specific slip control in certain driving situations in such a way that when performing the wheel-specific slip control on a first wheel a slip of a second wheel is taken into account;
   wherein the wheel-specific slip control on the first wheel is performed in such a way that a clamping force applied on the first wheel by a corresponding one of the multiple parking brake actuators is increased only if the controller determines: (a) the slip of the first wheel is lower than a first predefined non-zero threshold value; (b) the slip of the second wheel is lower than a second predefined non-zero threshold value, wherein the second predefined non-zero threshold value is greater than the first predefined non-zero threshold value, thereby taking into account the slip of the second wheel; and (c) the absolute value of a deceleration of the vehicle is lower than a predefined non-zero threshold value.

2. The automatic parking brake system of claim 1, wherein the second threshold value is between 3% and 5%.

3. The automatic parking brake system of claim 2, wherein the first threshold value is approximately 2%.

4. The automatic parking brake system of claim 2, wherein the actuators are electric motors situated on a brake caliper.

5. A method for controlling a slip of at least one wheel of a motor vehicle after triggering a braking operation using an automatic parking brake system of the motor vehicle, wherein the motor vehicle has at least one additional service brake distinct from the automatic parking brake system, the automatic parking brake system having multiple parking brake actuators, an operating element for operating the parking brake system, and a controller, wherein the multiple parking brake actuators are connected to the controller, the controller being configured to perform a wheel-specific slip control in certain driving situations, the method comprising:
   performing, by the controller, the wheel-specific slip control on a first wheel, wherein when performing the wheel-specific slip control on the first wheel a slip of a second wheel is taken into account;
   wherein performing the wheel-specific slip control on the first wheel comprises increasing a clamping force applied on the first wheel by a corresponding one of the multiple parking brake actuators in response to the controller determining: (a) the slip of the first wheel is lower than a first predefined non-zero threshold value; (b) the slip of the second wheel is lower than a second predefined non-zero threshold value, wherein the second predefined non-zero threshold value is greater than the first predefined non-zero threshold value, thereby taking into account the slip of the second wheel; and (c) the absolute value of a deceleration of the vehicle is lower than a predefined non-zero threshold value.

6. The method of claim 5, wherein the first threshold value is approximately 2%.

7. The method of claim 5, wherein the controller performs the wheel-specific slip control in a case that the at least one service brake is defective.

8. The method of claim 6, wherein the second threshold value is approximately 4%.

9. A control unit system for controlling a slip of at least one wheel of a motor vehicle using an automatic parking brake system of the motor vehicle, wherein the motor vehicle has at least one additional service brake distinct from the automatic parking brake system, and wherein the automatic parking brake system has multiple parking brake actuators and an operating element for operating the automatic parking brake system, the control unit system comprising:
   a slip controller, wherein the multiple parking brake actuators are connected to the slip controller, and wherein the slip controller is configured to perform a wheel-specific slip control in certain driving situations in such a way that when performing the wheel-specific slip control on a first wheel a slip of a second wheel is taken into account;

wherein the wheel-specific slip control on the first wheel is performed in such a way that a clamping force applied on the first wheel by a corresponding one of the multiple parking brake actuators is increased only if the controller determines: (a) the slip of the first wheel is lower than a first predefined non-zero threshold value; (b) the slip of the second wheel is lower than a second predefined non-zero threshold value, wherein the second predefined non-zero threshold value is greater than the first predefined non-zero threshold value, thereby taking into account the slip of the second wheel; and (c) the absolute value of a deceleration of the vehicle is lower than a predefined non-zero threshold value.

10. The control unit system of claim 9, wherein the second threshold value is between 3% and 5%.

11. The control unit system of claim 10, wherein the first threshold value is approximately 2%.

12. The control unit system of claim 11, wherein the first and second wheels are situated on opposite sides of an axle of the vehicle.

13. The control unit system of claim 9, wherein the actuators are electric motors situated on a brake caliper.

14. The automatic parking brake system of claim 1, wherein the controller is configured to perform the wheel-specific slip control in a case that the at least one service brake is defective.

15. The control unit system of claim 9, wherein the controller is configured to perform the wheel-specific slip control in a case that the at least one service brake is defective.

\* \* \* \* \*